US012420127B2

(12) United States Patent
Golinveaux

(10) Patent No.: US 12,420,127 B2
(45) Date of Patent: Sep. 23, 2025

(54) AUTOMATIC FIRE SPRINKLERS, SYSTEMS AND METHODS FOR FIRE PROTECTION OF STORAGE COMMODITIES WITH A HYBRID MINIMUM DESIGN PRESSURE

(71) Applicant: Viking Group, Inc., Caledonia, MI (US)

(72) Inventor: James E. Golinveaux, Ada, MI (US)

(73) Assignee: Viking Group, Inc., Caledonia, MI (US)

( * ) Notice: Subject to any disclaimer, the term of this patent is extended or adjusted under 35 U.S.C. 154(b) by 475 days.

(21) Appl. No.: 17/755,077

(22) PCT Filed: Nov. 9, 2020

(86) PCT No.: PCT/US2020/059699
§ 371 (c)(1),
(2) Date: Apr. 20, 2022

(87) PCT Pub. No.: WO2021/092569
PCT Pub. Date: May 14, 2021

(65) Prior Publication Data
US 2022/0401774 A1 Dec. 22, 2022

Related U.S. Application Data

(60) Provisional application No. 62/932,733, filed on Nov. 8, 2019.

(51) Int. Cl.

| | |
|---|---|
| ***A62C 3/00*** | (2006.01) |
| ***A62C 37/11*** | (2006.01) |
| *A62C 37/12* | (2006.01) |
| *A62C 37/14* | (2006.01) |

(52) U.S. Cl.
CPC .............. *A62C 37/11* (2013.01); *A62C 3/002* (2013.01); *A62C 37/12* (2013.01); *A62C 37/14* (2013.01)

(58) Field of Classification Search
CPC ......... A62C 37/11; A62C 3/002; A62C 37/12; A62C 37/14; A62C 35/60
See application file for complete search history.

(56) References Cited

U.S. PATENT DOCUMENTS

| | | | |
|---|---|---|---|
| 7,322,423 | B2 | 1/2008 | Ringer |
| 7,766,252 | B2 | 8/2010 | Jackson et al. |
| 7,857,069 | B2 | 12/2010 | Yu |
| 8,353,357 | B2 | 1/2013 | Thompson |
| 9,320,928 | B2 | 4/2016 | Golinveaux |

(Continued)

FOREIGN PATENT DOCUMENTS

| | | |
|---|---|---|
| GB | 2243080 | 10/1991 |

OTHER PUBLICATIONS

International Searching Authority, International Search Report and Written Opinion in International Appln. No. PCT/US2020/059699, Feb. 10, 2021, 16 pages.

*Primary Examiner* — Qingzhang Zhou
(74) *Attorney, Agent, or Firm* — Perkins Coie LLP

(57) ABSTRACT

System and methods using automatic fire protection sprinklers to provide ceiling-only fire protection of rack storage. The systems and methods provide for hydraulic and system parameters that include a hydraulic design area based upon five to no more than twelve hydraulically most remote fire protection sprinklers with a prescribed hybrid minimum design pressure.

19 Claims, 7 Drawing Sheets

(56) References Cited

U.S. PATENT DOCUMENTS

| | | | | |
|---|---|---|---|---|
| 9,776,028 | B2 | 10/2017 | Feenstra et al. | |
| 10,272,274 | B2 * | 4/2019 | Multer ..................... | A62C 3/06 |
| 10,661,107 | B2 | 5/2020 | Workman et al. | |
| 11,224,775 | B2 * | 1/2022 | Silva, Jr. ................ | A62C 3/002 |
| 2005/0224238 | A1 | 10/2005 | Thomas et al. | |
| 2011/0121100 | A1 | 5/2011 | Feenstra | |
| 2017/0120090 | A1 | 5/2017 | Magnone et al. | |
| 2017/0216641 | A1 | 8/2017 | Magnone et al. | |
| 2019/0099630 | A1 | 4/2019 | Pigeon | |

* cited by examiner

AUTOMATIC FIRE SPRINKLERS, SYSTEMS AND METHODS FOR FIRE PROTECTION OF STORAGE COMMODITIES WITH A HYBRID MINIMUM DESIGN PRESSURE

PRIORITY CLAIM & INCORPORATION BY REFERENCE

This application is a 35 U.S.C. § 371 application of International Application No. PCT/US2020/059699, filed Nov. 9, 2020, which claims the benefit of U.S. Provisional Application No. 62/932,733 filed Nov. 8, 2019, each of which is incorporated by reference in its entirety.

TECHNICAL FIELD

The present invention generally relates to sprinklers used in automatic fire protection systems for storage buildings, warehouses and the like.

BACKGROUND ART

The design and installation of automatic fire sprinkler protection systems is dependent upon several factors including: the area to be protected, the occupants or items to be protected in the area being protected, the manner in which a fire is to be addressed. One particular area of interest is automatic fire protection systems for the protection of the following types of storage arrangements: palletized storage, solid pile storage, shelf storage, bin-box storage, or rack storage and more particularly for the protection of such storage in excess of twelve feet of height, i.e., high-piled storage. Fire protection systems for rack storage generally include a gridded arrangement of spaced apart automatic fire protection sprinklers installed above the rack storage and beneath the ceiling of the storage occupancy, i.e., ceiling-level sprinklers, which are connected to a supply of fire-fighting fluid by a network of pipes to distribute the fluid upon actuation in response to a fire. The rack storage systems can be configured with only ceiling-level sprinklers, i.e., a "ceiling-only" system or alternatively can include ceiling-level and face sprinklers installed in the rack, i.e., "in-rack" sprinklers, or along the aisle face of the storage. As used herein, "ceiling-only" fire protection is where the water or other fire suppressant is exclusively applied from ceiling-level sprinklers and therefore do not include in-rack sprinklers.

Fire protection installations are generally subject to industry accepted fire code requirements and the approval of the "authority having jurisdiction" (AHJ) to ensure compliance with the applicable codes and requirements. For example, one applicable standard is "NFPA 13: Standard for the installation of Sprinkler Systems" (2016 edition & 2019 edition) ("NFPA 13") from the National Fire Protection Association (NFPA). NFPA 13 provides the minimum requirements for the design and installation of automatic fire sprinkler systems based upon the area to be protected, the anticipated hazard and the type of protection performance to be provided. Another industry accepted installation standard focused on both safety and property loss is FM Global Property Loss Prevention Data Sheet 8-9 (June 2015, Interim Rev. January 2018); (March 2010, Interim Rev. July 2018); (March 2010, Interim Rev. January 2020); and (March 2010, Interim Rev. July 2020) (collectively "FM 8-9") from Factory Mutual Insurance Company of FM Global. FM 8-9 provides FM installation guidelines for the protection of Class 1, 2, 3, 4, and plastic commodities maintained in solid-piled, palletized, shelf, bin-box or rack storage arrangements.

NFPA 13 defines the performance of rack storage fire protection systems based upon the manner in which the system and its automatic fire sprinklers are designed to address a fire. For example, a system and its sprinklers can be configured to address a fire with "fire control," as defined under NFPA 13, does so by "limiting the size of a fire by distribution of water so as to decrease the heat release rate and pre-wet adjacent combustibles, while controlling ceiling gas temperatures to avoid structural damage." Systems and sprinklers can also be alternatively configured for "fire suppression" performance which is defined under NFPA 13 as "sharply reducing the heat release rate of a fire and preventing its regrowth by means of direct and sufficient application of water through the fire plume to the burning fuel surface." FM 8-9 installation guidelines are designed to provide suppression performance in rack storage protection. As used herein, "suppression mode" systems or sprinklers are defined as systems or components that sharply reduce the heat release rate of a fire and prevent its regrowth by directly and sufficiently applying water or other fire suppressant through the fire plume to the burning fuel source. FM 8-9 expressly refers to the term "Suppression Mode sprinkler" as a "Storage sprinkler."

In order to satisfy the requirements for ceiling-only rack storage fire protection systems, the ceiling-level sprinklers demonstrate a capability for effectively addressing, and preferably suppressing, a fire of known size with a minimum number of sprinkler operations located at a desired ceiling-level installation height above the rack storage. Generally, for a fire sprinkler system to be approved for suppression performance it is typically demonstrated to the AHJ that the system and its equipment, including its fire protection sprinklers, are suitable for suppression performance. To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." One such listing organization includes, Underwriters Laboratories Inc. ("UL"). UL 1767 Standard for Safety Early-Suppression Fast Response Sprinklers (4th ed. 2013, rev. 2015) from Underwriters Laboratories Inc. ("UL1767") provides the water distribution and fire test standards to establish that a sprinkler is suitable for early suppression fast response performance under applicable installation guidelines.

FM approved storage sprinklers are subject to the FM Approvals "Approval Standard for Quick Response Storage Sprinklers for Fire Protection—Class Number 2008" (February 2018) ("FM 2008") from FM Approvals LLC. FM Approved Storage Sprinklers, under FM 2008, are tested to determine suitability for a specified use, i.e., ceiling-level storage protection providing suppression performance Like UL 1767, FM 2008 provides the water distribution and fire test standards to establish that a given sprinkler is suitable for ceiling-level performance for storage protection under applicable installation guidelines.

System design and installation criteria can be prescribed for sprinklers, for use in accordance with applicable installation codes and standards. This design criteria can include: (i) the maximum ceiling-height for which ceiling-only protection can be provided; (ii) the hazard classifications and type of storage arrangement that can be protected at the maximum ceiling-height; (iii) the maximum height of the storage to be protected; (iv) the range of spacing between sprinklers installed at the maximum ceiling height and/or (v) the hydraulic design requirements. Accordingly, under both NFPA and FM installation guidelines, there are several design considerations in the use and installation of ceiling-level sprinklers for rack storage protection. These considerations include: the hazard type or "classification" of the stored commodity, the storage arrangement, the maximum or peak ceiling height, and the characteristics of the sprinkler to be used. Industry accepted commodity hazard classifications, including under FM 8-9 guidelines, segregate materials according to their degree of combustibility. For example, FM 8-9 lists the following commodity classifications in order from lowest hazard to highest hazard: Class 1, Class 2, Class 3, Class 4, cartooned unexpanded plastic, cartooned expanded plastic, uncartooned unexpanded plastic and uncartooned expanded plastic. Accordingly, uncartooned unexpanded and expanded plastic commodities represent the two most challenging fire hazards ("high hazard"), with uncartooned expanded plastic commodities representing the most challenging fire scenario. Under NFPA 13 guidelines, plastic commodities are classified under Group A, Group B-Class IV, or Group C-Class III plastics with Group A plastics being the most combustible or highest hazard. The Group A plastics are separately classifiable as cartooned (unexpanded or expanded) and uncartooned (unexpanded or expanded). Rack storage can have various kinds of commodity arrangements including: single row, double-row or multiple-row arrangements. Additionally, the rack arrangement can be defined by flue spaces and aisle widths between the arranged rows. In addition to the commodity classification or hazard, the rack storage fire protection system criteria under the guidelines are defined by the maximum ceiling height of the occupancy and the maximum height of the storage.

Based upon the various design considerations for rack storage, the hydraulic design criteria provided under the installation standards specifies: (i) a total number of design sprinklers; and (ii) a "hydraulic minimum design pressure" for each design sprinkler. The hydraulic minimum design pressure is a prescribed single minimum operating pressure value for each design sprinkler that is to be provided by the system fluid supply and piping for protection of a specified maximum storage height and/or maximum ceiling height. The design sprinklers are an identified number of "most hydraulically remote sprinklers." As used herein the most hydraulically remote sprinklers are those sprinklers that experience the greatest fluid pressure loss relative to the fluid supply source when supplying the sprinklers with the hydraulic minimum design pressure for the sprinkler.

A fire protection system can be configured to define the manner in which firefighting fluid is delivered to the system sprinklers. For example, one system configuration provides that the network of pipes is filled with the firefighting fluid to provide each of the design sprinklers with the hydraulic minimum design pressure in the unactuated state of the system. Storage fire protection systems having such a piping configuration is shown and described in U.S. Pat. No. 10,661,107. More specifically U.S. Pat. No. 10,661,107 shows ceiling-only storage protection systems for rack storage up to fifty feet (50 ft.) and a maximum ceiling height of up to fifty-five feet (55 ft.). The systems described therein are hydraulically configured with design areas defined by five to no more than twelve (5-12) design sprinklers. The piping network of the systems described in U.S. Pat. No. 10,661,107 are filled with firefighting fluid to provide the design sprinklers of the system with the hydraulic design pressure in the unactuated state of the system such that upon thermal actuation of any sprinkler in the system, the firefighting fluid is discharged from the actuated sprinkler at the prescribed minimum pressure or greater.

In contrast, a system and its network of piping can be configured in which the hydraulic minimum design pressure is withheld from the design sprinklers in the unactuated state of the system. Examples of systems in which the minimum design pressure is delayed or withheld from the design sprinklers are shown and described in the following patent documents: U.S. Pat. Nos. 7,857,069 and 9,776,028, U.S. Patent Application Publication No. 2017/0216641 and U.K. Patent Application Publication No. GB2243080A. Generally, the cited patent documents describe systems in which the piping network is filled with firefighting fluid to deliver a prescribed pressure to the system sprinklers in an unactuated state of the system, but after thermal actuation of one or more sprinklers, the system withholds or delays delivery of the firefighting fluid to the sprinklers at full operating pressure for a period of time.

The hydraulic design criteria can be a function of the system configuration. The total number of design sprinklers and/or the hydraulic design pressure can depend upon whether or not full operating pressure to an actuated sprinkler is immediately delivered or delayed upon thermal actuation. Regardless of the system configuration, hydraulic criteria for known fire protection systems specify a single, common pressure value as the prescribed hydraulic design pressure common to each design sprinkler in the total number of design sprinklers.

The installation, listing and/or approval guidelines and standards require consideration of several characteristics of the sprinkler for application and compliance. Sprinkler characteristics include: the orifice size or nominal K-factor of the sprinkler, the installation orientation (pendent or upright), the thermal sensitivity or response time index (RTI) rating of the sprinkler, the sprinkler deflector details and the sprinkler spacing or coverage. Generally, automatic fire protection sprinklers include a solid metal body connected to a pressurized supply of water, and some type of deflector spaced from the outlet is used to distribute fluid discharged from the body in a defined spray distribution pattern over the protected area. The discharge or flow characteristics from the sprinkler body is defined by the internal geometry of the sprinkler including its internal passageway, inlet and outlet (the orifice). As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway though the sprinkler body.

Under the guidelines, the design sprinklers and their spacing or coverage requirements define the "design area" of the system. Because the design area is defined by the identified most hydraulically remote sprinklers, the design area is the "most hydraulic remote area" of the system. As used herein, the most hydraulically remote area means the area that must be proven by hydraulic calculation that, if all sprinklers within the design area actuate, the piping and supply can provide the prescribed hydraulic minimum design pressure for each of the design sprinklers. The hydraulic minimum design pressure in combination with the discharge characteristics of the design sprinklers determines a prescribed fluid flow or demand from the design area.

The spray pattern or distribution of a firefighting fluid from a sprinkler defines sprinkler performance. Several factors can influence the water distribution patterns of a sprinkler including, for example, the shape of the sprinkler frame, the sprinkler orifice size or discharge coefficient (K-factor), and the geometry of the deflector. The deflector is typically spaced from the outlet of the body. The deflector geometry is particularly significant since the deflector is the main component of the sprinkler assembly and to a great extent, defines the size, shape, uniformity, and water droplet size of the spray pattern.

To control fluid discharge from the sprinkler body is a fusible or thermally responsive trigger assembly which secures a seal over the central orifice. When the temperature surrounding the sprinkler is elevated to a pre-selected value indicative of a fire, the trigger assembly releases the seal and water flow is initiated through the sprinkler. The thermal sensitivity of the trigger assembly and sprinkler is measured or characterized by Response Time Index ("RTI"), measured in units of $(m\text{-}s)^{1/2}$. Under the FM 2008 standard, an RTI of 80 $(m\text{-}s)^{1/2}$ to 350 $(m\text{-}s)^{1/2}$ [145-635 $(ft.*s)^{1/2}$] defines a "Standard Response Sprinkler and an RTI equal to or less than 50 $(m\text{-}s)^{1/2}$ [90 $(ft.*s)^{1/2}$] defines a "Quick Response Sprinkler." Under the standard, a "Quick Response Sprinkler" with a nominal K-factor of 14 or larger has an RTI of 19 to 36 $(m\text{-}s)^{1/2}$ [35-65 $(ft.*s)^{1/2}$]. Under UL1767 an Early Suppression Fast Response Sprinkler has an RTI of no more than 36 $(m\text{-}s)^{1/2}$ [65 $(ft.*s)^{1/2}$].

There are generally two types of thermally responsive trigger assemblies: frangible and non-frangible. Frangible trigger assemblies generally include a liquid-filled frangible glass bulb that shatters upon reaching its rated temperature. Non-frangible trigger assemblies can include fusible links or soldered mechanical arrangements in which the components of the assembly separate upon fusion of the solder reaching its rated temperature. One type of fusible link arrangement includes a strut and a lever or multiple pin arrangement held together by a fusible link to support a sealing assembly within the discharge orifice of the sprinkler. Examples of such fusible link arrangements are shown and described in U.S. Pat. Nos. 8,353,357 and 7,766,252 and U.S. Patent Application Publication Nos. 2011/0121100 and 2005/0224238. The strut and lever are held by the fusible link in an assembled orientation which transfers a compressive force of a load member acting on the strut lever arrangement to the seal assembly. Upon fusion of the solder material and separation of the fusible link in the presence of a sufficient level of heat or fire, the lever and strut members collapse and the sprinkler is actuated with the seal released to initiate the discharge of fluid.

Again, hydraulic criteria for known fire protection systems specify a single, common pressure value as the prescribed hydraulic design pressure common to each design sprinkler in the total number of design sprinklers. Accordingly, the prescribed fluid flow or demand of known systems is based upon a hydraulic calculation using a single, common prescribed hydraulic design pressure value common to each design sprinkler defining the design area of the system.

DISCLOSURE OF INVENTION

Preferred systems and methods are provided for fire protection of high-piled storage and high hazard commodities in rack storage arrangements without the need for in-rack sprinklers. Moreover, preferred embodiments of the systems and methods can provide suppression-mode ceiling-only storage occupancy fire protection for high hazard commodities in rack storage arrangements. The preferred systems and methods described herein are defined by design criteria having uniquely identified hydraulic and system parameters that include a preferred prescribed hybrid minimum design pressure. The hybrid minimum design pressure is preferably defined by a combination of prescribed hydraulic minimum design pressures for a respective number of subsets or sets of design sprinklers in the design area. Preferably, a set of one or more of all the design sprinklers defining the design area are prescribed with one preferred hydraulic minimum design pressure and a separate set of the design sprinklers are prescribed with a different hydraulic minimum design pressure. Accordingly, in preferred embodiments of the systems and methods, a preferred hybrid minimum design pressure can be defined by a first hydraulic minimum design pressure for a first set of design sprinklers and a second hydraulic minimum design pressure, different than the first hydraulic minimum design pressure, for a second set of design sprinklers.

The preferred systems and methods are capable of providing ceiling-only storage fire protection for high-piled, high hazard commodities, including those in rack storage arrangements stored to a maximum of up to fifty feet beneath a ceiling of having a maximum ceiling height of fifty-five feet. Accordingly, preferred embodiments of systems and methods can provide ceiling-only fire protection of high-piled storage that can include up to fifty feet (50 ft.) of rack storage of cartooned unexpanded plastic commodities and less hazardous commodities, such as for example, Class 1, Class 2, Class 3, Class 4 and/or combinations thereof beneath a ceiling having a maximum ceiling height up to fifty-five feet (55 ft.). Alternatively, the systems and methods can provide ceiling-only fire protection of high-piled storage that can include up to forty-five feet (45 ft.) of rack storage of cartooned unexpanded plastic commodities and less hazardous commodities beneath a ceiling having a maximum ceiling height up to fifty feet (50 ft.). Thus, preferred embodiments of the systems and methods herein can provide ceiling-only fire protection of cartooned unexpanded plastic commodities and less hazardous commodities at lower storage heights and ceiling heights thereby providing ceiling-only storage fire protection beneath a ceiling having a maximum ceiling height below feet (50 ft.) and/or a storage height below forty-five feet (45 ft.).

A preferred embodiment of a ceiling-only storage occupancy fire protection system and method of installation include a grid of pendent fire protection sprinklers defining a sprinkler-to-sprinkler spacing ranging from eight feet to twelve feet (8 ft.-12 ft.). Each sprinkler preferably includes a sprinkler body having an inlet and an outlet with a passageway disposed therebetween along a sprinkler axis and a nominal K-factor of 14 [$GPM/(psi)^{1/2}$] to 36.4 [$GPM/(psi)^{1/2}$]. A closure assembly includes a plug and a thermally responsive trigger assembly to support the closure assembly adjacent the outlet of the sprinkler body and seal the outlet in an unactuated state of the sprinkler. The trigger assembly has a temperature rating in a range from 155° F. to 210° F. and a deflector coupled to the body and spaced from the outlet. The system includes a network of pipes including at least one main pipe and a plurality of spaced apart branch lines interconnecting and locating the grid of pendent sprinklers beneath a ceiling having a ceiling height of up to a maximum fifty-five feet (55 ft.).

The network of pipes locates the grid of sprinklers relative to a source of firefighting fluid to define a hydraulic design area of the system with a total number of design sprinklers ranging from five to no more than twelve (5-12) design sprinklers. The system provides storage protection of high-piled storage defining a maximum storage height of up to fifty feet (50 ft.) and a configuration of any one of single-row, double-row, and multi-row rack storage. The network of pipes is filled with the firefighting fluid to provide each of the design sprinklers with a prescribed hydraulic minimum design pressure in an unactuated state of the system. The prescribed hydraulic minimum design pressure preferably includes a hybrid minimum design pressure.

Another preferred embodiment includes a preferred method for supplying a ceiling-only storage occupancy fire protection system. The preferred method includes obtaining a plurality of storage sprinklers; and providing the plurality of sprinklers for ceiling-only installation relative to a source of firefighting fluid to define a hydraulic design area defined by a total number of design sprinklers with a prescribed hydraulic minimum design pressure in an unactuated state of the system. The preferred method includes providing the prescribed hydraulic minimum design pressure includes a hybrid minimum design pressure.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
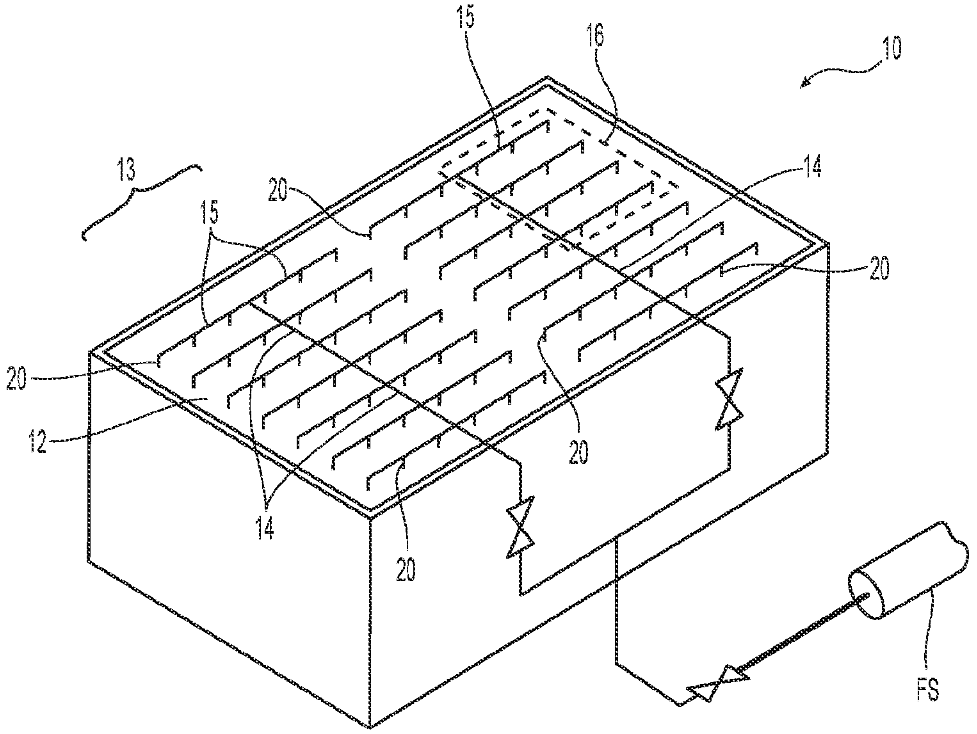
FIG. 1 is a schematic perspective view of a preferred embodiment of a storage fire protection system.
Figure 2:
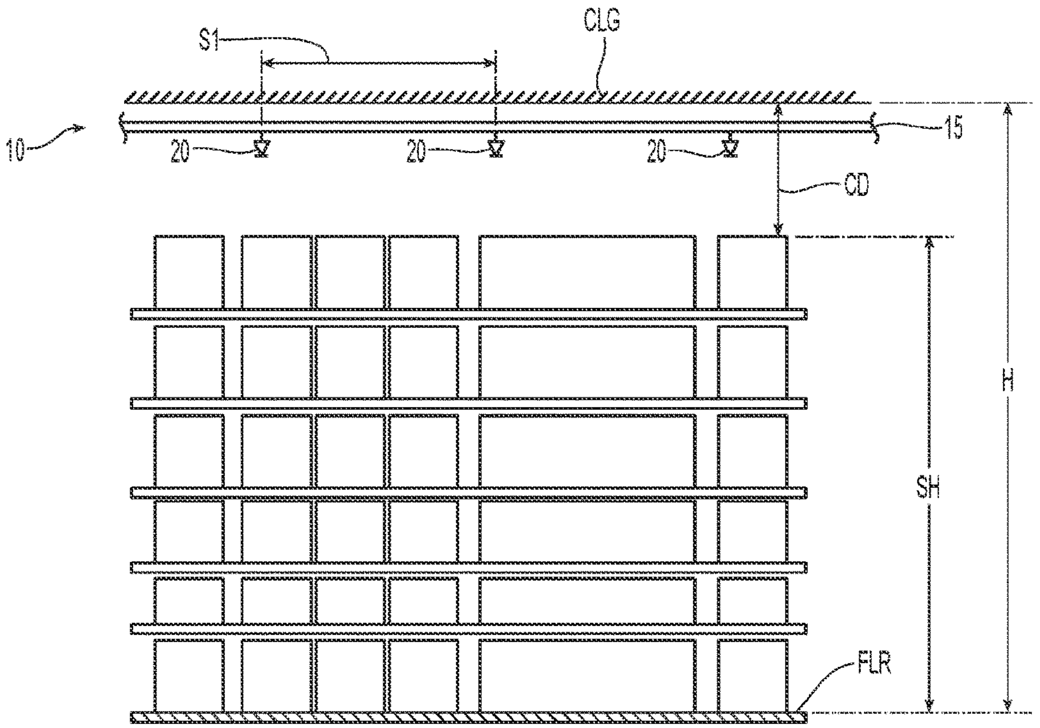
FIG. 2 is illustrative side elevation view of a storage arrangement protected by the storage fire protection system of FIG. 1.
Figure 2A:
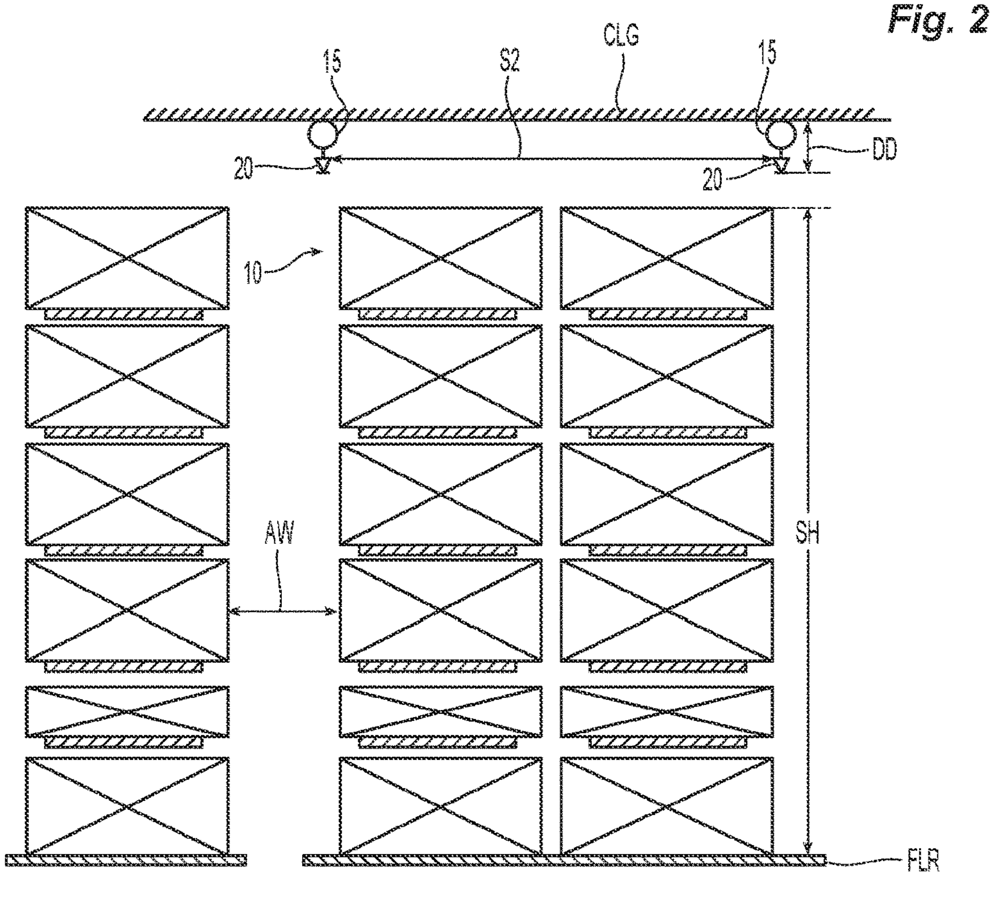
FIG. 2A is illustrative end elevation view of the storage arrangement of FIG. 2.

Shown in FIG. 1 is an illustrative schematic view of a preferred embodiment of a fire protection sprinkler system 10 for protection of a storage occupancy 12 with only ceiling-level sprinklers (“ceiling-only”) to distribute firefighting fluid for addressing a fire in the occupancy. Preferred embodiments of the system 10 provide a ceiling-only storage occupancy fire protection system that provides fire protection for high-piled storage that can include high hazard commodities in a rack storage arrangement as schematically shown in FIGS. 2 and 2A. Accordingly, the preferred embodiments of systems and methods described herein can provide storage fire protection of cartooned unexpanded plastic commodities, as defined by industry accepted standards such as FM 8-1 and NFPA 13, and less hazardous commodities, such as for example, Class 1, Class 2, Class 3, Class 4 and/or combinations thereof. As further illustrated in FIGS. 2 and 2A, the preferred embodiments of the systems and methods can provide ceiling-only storage occupancy fire protection beneath a ceiling CLG having a maximum ceiling height H of up to fifty-five feet above a floor FLR for rack storage having a maximum storage height SH of up to fifty feet to define a preferred minimum clearance distance CD of five feet from the ceiling. Moreover, preferred embodiments of the systems and methods can provide ceiling-only fire protection beneath a ceiling CLG having a maximum ceiling height H of up to fifty feet above the floor FLR for rack storage having a maximum storage height SH of up to forty-five feet to define the preferred minimum clearance CD of five feet from the ceiling CLG. Accordingly, it should be understood that the preferred systems and methods can provide ceiling-only storage fire performance protection beneath ceilings of even lower ceiling heights and/or for rack storage at lower storage heights.

FIGS. 2 and 2A illustratively show a double row rack arrangement that consists of metal rack structure with flue spaces and open shelves covered by the stored commodity. Although a double row rack arrangement is shown, it should be understood that the preferred systems described herein can be configured for protection of single row, double row or multi-row rack storage arrangements in addition to protection of non-rack arrangements such as, for example, palletized storage, solid pile storage, shelf storage, or bin-box storage. Moreover, preferred embodiments of the system can provide protection for a range of aisle widths AW between racks that preferably ranges between four to eight feet (4-8 ft.), and more preferably provides for protection for an aisle width of six feet (6 ft.) and even more preferably an aisle width of four feet (4 ft).

In the illustrated embodiments, system 10 includes a grid of fire protection sprinklers 20 coupled to a network of pipes 13 that includes one or more main pipes 14 from which a plurality of spaced apart branch lines 15 extend. The main pipe 14 is connected to a source of firefighting fluid FS, such as a water supply main. The sprinklers 20 are coupled to the branch lines 15 interconnected and spaced from one another and located relative to the fluid source. Moreover, the network of pipes locates the sprinklers 20 beneath the ceiling CLG preferably within two feet of the ceiling. The sprinklers 20 are preferably of the pendent type with its fluid deflector located arranged at a preferred distance DD of up to eighteen inches (18 in.) below the ceiling CLG and is even more preferably no more than fourteen inches (14 in.) below the ceiling CLG. Moreover, the storage commodity is preferably arranged to define a clearance distance of thirty-six inches (36 in.) or more between the top of the storage and the deflector. The sprinklers 20 are preferably located from one another by a sprinkler-to-sprinkler spacing S1, S2 which ranges from eight to as great as twelve feet (8-12 ft.).

With specific reference to FIG. 1, in any type of a gridded fire protection system there is a group of design sprinklers defined by a preferred total number of most hydraulically remote sprinklers whose sprinkler-to-sprinkler spacing define a hydraulic design area 16 of the system 10. The sprinklers of the preferred systems herein are preferably demonstrably capable of providing storage fire protection, for example, by demonstrating a capability for providing a desired suppression protection and more preferably being qualified for providing suppression protection through appropriate water distribution and/or fire testing. However, other fire protection sprinklers can also be used in the preferred systems and methods described herein provided the sprinklers are suitable for storage protection.

In the preferred system 10 and its preferred method of storage protection, the preferred sprinklers are installed in a gridded arrangement and coupled to a fluid source by a network of pipes to fill the pipes and implement a preferred hydraulic design in which each of the design sprinklers is provided with a preferred prescribed hydraulic minimum design pressure in an unactuated state of the system. More particularly, the design sprinklers are provided with a prescribed hydraulic minimum design pressure that includes a "hybrid minimum design pressure" which, as used herein, means a combination of prescribed hydraulic minimum design pressures in which a subgroup or set of one or more of all the design sprinklers defining the design area 16 are prescribed with one preferred hydraulic minimum design pressure and a remaining set of all the design sprinklers are prescribed with a different hydraulic minimum design pressure. Thus, a set of one or more of all the design sprinklers defining the design area are preferably prescribed with one preferred hydraulic minimum design pressure and a separate set of the design sprinklers are prescribed with a different hydraulic minimum design pressure.

In some preferred embodiments of the prescribed hybrid minimum design pressure, one hydraulic minimum design pressure is 50% greater than the other hydraulic minimum design pressure. Other preferred embodiments of the prescribed hybrid minimum design pressure provided for a smaller differential between the two minimum hydraulic design pressures. More specifically, the two design pressures making up the prescribed hybrid minimum design pressure can define a differential therebetween that ranges from 40%-50%, or preferably defines a differential that ranges from 30%-40%, more preferably defines a differential that ranges 20%-30%, even more preferably defines a differential that ranges from 15%-20% and yet even more preferably defines a differential that ranges from 10%45%. Alternatively or additionally, in the prescribed hybrid minimum design pressure, one hydraulic minimum design pressure is preferably at least 10 psi. greater than the other hydraulic minimum design pressure. Accordingly, one hydraulic minimum design pressure can be 10 psi., 20 psi., 30 psi or 40 psi. or greater than the other hydraulic minimum design pressure. In systems and methods having the preferred hybrid minimum design pressure, a first hydraulic minimum design pressure is prescribed for a first set of design sprinklers and a second hydraulic minimum design pressure, different than the first hydraulic minimum design pressure is prescribed for a second set of design sprinklers preferably exclusive of the first set of design sprinklers.

In some preferred embodiments, the preferred hydraulic minimum design pressure is less than one hundred pounds per square inch (100 psi.) of firefighting fluid, e.g., water. In some embodiments of the system 10, the hydraulic minimum design pressures fall into one or more of the following preferred ranges of pressure: from 35-100 psi., more preferably ranging from 50-100 psi., even more preferably ranging from 60-100 psi., yet even more preferably ranging from 75-100 psi. Thus, for example, a preferred hybrid minimum design pressure can be defined by a first hydraulic minimum design pressure of 80 psi. for a first set of design sprinklers defining the design area and a second hydraulic minimum design pressure of 40 psi for a second set of design sprinklers, preferably exclusive of the first set, defining the design area.

Figure 3:
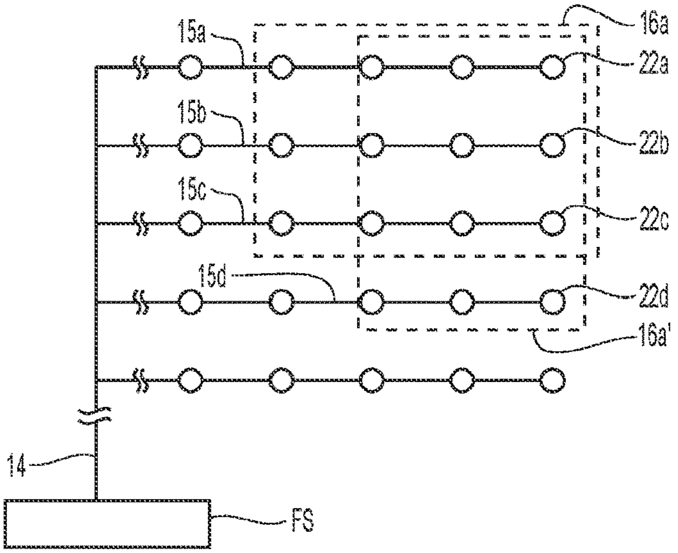
FIGS. 3-3B are schematic views of various preferred embodiments of a hydraulic design area for use in the system of FIG. 1.
Figure 3A:
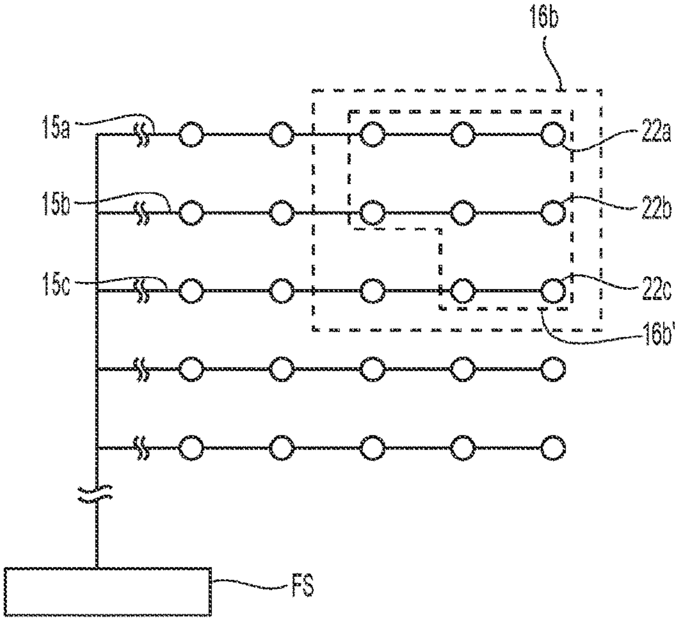
Figure 3B:
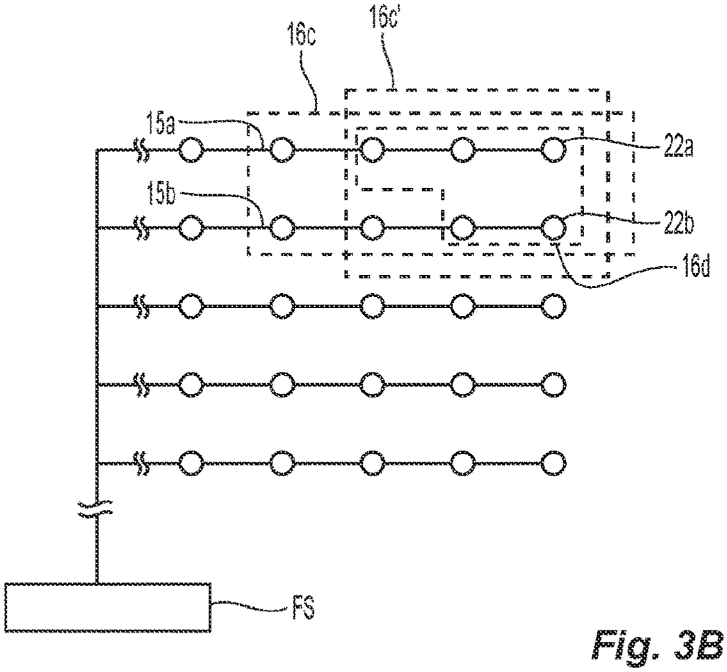

Schematically shown in FIGS. 3-3B are preferred embodiments of the hydraulic design area 16 of the system 10 defined by a preferred total number of design sprinklers 22, which are hydraulically located most remotely from the fluid source FS. For each preferred hydraulic design area 16, the total number of design sprinklers preferably ranges from five to twelve (5-12) and preferably less than twelve design sprinklers 22. The design sprinklers are preferably disposed or arranged along and coupled to two or more spaced apart branch lines 15 and preferably arranged on and coupled to no more than four branch lines. The number of branch lines to which the design sprinklers are connected identify a respective number of design sprinkler groups. An individual design sprinkler group on an individual branch line can have one to preferably no more than five design sprinklers depending upon the total number of design sprinklers 22 defining the design area 16. Preferably, the number of design sprinklers 22 are equally divided among the design sprinkler groupings and respective branch lines 15. Alternatively, the design sprinklers 22 can be unequally divided among the groupings. Accordingly, any preferred design sprinkler arrangement on a given number of branch lines can be implemented on fewer or more branch lines. Moreover, any one preferred design area 16 defined by a prescribed total number of design sprinklers can be expanded or reduced and arranged on fewer or more branch lines to define another preferred design area 16.

For example, as seen in FIG. 3, a first preferred embodiment of the hydraulic design area 16*a* is defined by a total of ten to preferably no more than twelve (10-12) design sprinklers. The design sprinklers of the design area 16*a* are preferably divided into three groups 22*a*, 22*b*, 22*c* respectively disposed on and coupled to three branch lines 15*a*, 15*b*, 15*c*. FIG. 3 also shows an alternate embodiment of the design area 16*a*' that is divided into four groups 22*a*, 22*b*, 22*c*, 22*d* coupled to four branch lines 15*a*, 15*b*, 15*c*, 15*d*. Preferably, the total number of design sprinklers are equally divided among the branch lines and respective design sprinkler groups. Thus, as shown where the design area 16*a* is defined by a total of twelve design sprinklers on three branch lines 15*a*, 15*b*, 15*c*, each of the three design sprinkler groups 22*a*, 22*b*, 22*c* has four design sprinklers. Alternatively, the design area 16*a*' of twelve design sprinklers is preferably on four branch lines 15*a*, 15*b*, 15*c*, 15 to define four design sprinkler groups 22*a*, 22*b*, 22*c*, 22*d* with each group having three design sprinklers. Accordingly, a given preferred sprinkler design areas of design sprinklers and branch lines can define an alternate embodiment of a design area by arranging the design sprinklers on additional or fewer branch lines.

The total number of design sprinklers defining the design area can also be divided unequally among the design sprinkler groups and the respective branch lines. Thus, for example, where a design area is defined by a total of ten design sprinklers (not shown) the design sprinklers can be divided into three groups on three branch lines. In such an arrangement, a first group 22*a* preferably includes four sprinklers disposed on the first branch line 15*a*, with the second group 22*b* having three sprinklers on the second branch line 15*b*, and the third group 22*c* having three sprinklers disposed on the third branch line 15*c*. Accordingly, in preferred embodiments, the largest group of design sprinklers is located on the most hydraulically remote branch line. Another arrangement can provide for a first group of four design sprinklers on the first branch line 15*a*, a second group of four design sprinklers on the second branch line 15*b* with a third group of two design sprinklers on the third branch line 15*c*. Alternate embodiments of the design area having a total of ten design sprinklers can be divided into four groups disposed on four branch lines. Such a design area can be preferably defined with the first group 22*a* that includes three sprinklers on the first branch line 15*a*, the second group 22*b* having three sprinklers on the second branch line 15*b*, the third group 22*c* having three sprinklers on the third branch line 15*c* and the fourth group 22*d* having one sprinkler on the fourth branch line 15*d*.

Shown in FIG. 3A, are alternate embodiments of the hydraulic design area in which there are five to fewer than ten design sprinklers. In one preferred embodiment shown, there are a total of nine (9) design sprinklers defining the hydraulic design area 16*b*, which are preferably divided into three groups 22*a*, 22*b*, 22*c* and coupled to three separate branch lines 15*a*, 15*b*, 15*c*. In a preferred arrangement in which the design sprinklers are equally divided among the design sprinkler groups, the first group 22*a* includes three sprinklers on the first branch line 15*a*, the second group 22*b* includes three sprinklers on the second branch line 15*b*, and the third group 22*c* includes three sprinklers on the third branch line 15*c*. Again, the total number of design sprinklers can alternatively be unequally divided among the design sprinkler groups. For example, the nine design sprinklers can be divided with a first group having four sprinklers on the first branch line 15*a*, a second group of four sprinklers on the second branch line 15*b*, and a third group of one sprinkler on the third branch line 15*c*.

The descriptions of the ten-sprinkler design areas on four branch lines and the nine-sprinkler design areas on three branch lines illustrates that any preferred design area could be reduced or expanded accordingly by inclusion or exclusion of sprinklers and/or branch lines in defining an alternative desired design area of a desired total number of design sprinklers. For example, FIG. 3A specifically illustrates an alternate embodiment of the design area 16*b*' in which no more than eight (8) design sprinklers are unequally divided among the design sprinkler groups 22*a*, 22*b*, 22*c* located on three spaced apart branch lines 15*a*, 15*b*, 15*c*. In the embodiment shown, the first group 22*a* preferably includes three sprinklers on the first branch line 15*a*, the second group 22*b* includes three sprinklers on the second branch line 15*b*, and the third group 22*c* includes two sprinklers on the third branch line 15*c*. It should be understood that an alternate arrangement (not shown) of the eight design sprinklers can be equally divided among four design sprinkler groups on four branch lines in which each design sprinkler group includes two sprinklers on one of four branch lines.

Alternate embodiments of the design area can be defined by hydraulic design sprinklers located on only two spaced apart branch lines. For example, as shown in FIG. 3B, is an alternate embodiment of the hydraulic design area 16*c* in which the eight (8) design sprinklers which are preferably divided into two equal groups of four design sprinklers located on two spaced apart branch lines 15*a*, 15*b*. In an alternate embodiment of the hydraulic design area 16*c*', the design area is defined by a preferred six (6) design sprinklers which are preferably divided into two equal groups of three design sprinklers located on the two branch lines 15*a*, 15*b*. Although not shown, it should be understood that alternate design areas defined by five, seven, nine, ten, eleven or twelve sprinklers can be divided into two groups of design sprinklers located on the two branch lines. Additional alternative embodiments a preferred expanded design area can be provided by including additional branch lines in a manner as previously described.

The preferred ceiling-only systems described herein provide for rack storage fire protection with hydraulic design areas defined by as few as five (5) design sprinklers. Illustrated in FIG. 3B is a preferred hydraulic design area 16*d* with no more than five design sprinklers divided into the two groups 22*a*, 22*b* preferably disposed on only two branch lines 15*a*, 15*b*. Accordingly, two groupings of unequal numbers of design sprinklers can be disposed on the two branch lines. For example, where there a design area is defined by a total of nine (9) design sprinklers, as seen in FIG. 4B, the design sprinklers can be divided into one group of five design sprinklers on one branch line and another group of four design sprinkler on the other branch line.

Preferred embodiments of the system and hydraulic design area are prescribed with a hybrid minimum design pressure. Preferred embodiments of a design area 16 having a hybrid minimum design pressure include a first set of no more than five of design sprinklers prescribed with a minimum hydraulic design pressure of 80 psi. and a second set of design sprinklers, preferably the remaining design sprinklers and preferably no more than five sprinklers, prescribed with a different minimum design pressure. For example, with the reference to FIG. 4A, in a design area defined by a total of nine (9) design sprinklers divided into three equal groups of three and coupled to three branch lines 15*a*, 15*b*, 15*c*, a first set 100*a* of four design sprinklers have a prescribed minimum design pressure of 80 psi and the remaining set 100*b* of five design sprinklers have a prescribed minimum design pressure of no less than 40 psi. and more preferably a minimum hydraulic design pressure of 40 psi. As shown, the preferred set 100*a* of four design sprinklers at the 80 psi minimum design pressure is preferably defined by two pairs of design sprinklers on two parallel branch lines 15*a*, 15*b* with the second set 100*b* being distributed over the three branch lines 15*a*, 15*b*, 15*c* of the design area. In an alternate embodiment, five design sprinklers have prescribed minimum design pressure of 80 psi. with the remaining design sprinklers prescribed a different minimum design pressure. With reference to FIG. 4B, in which a design area is defined by nine (9) design sprinklers divided into two unequal groups and coupled to two parallel branch lines 15*a*, 15*b*, one set 100*a*' of the five most hydraulically remote of the nine design sprinklers on one branch line 15*a*, can have a prescribed minimum design pressure of 80 psi and the second set 100*b*' defined by the remaining four design sprinklers on the other branch line 15*b* can have a prescribed minimum design pressure of 40 psi.

Figure 4A:
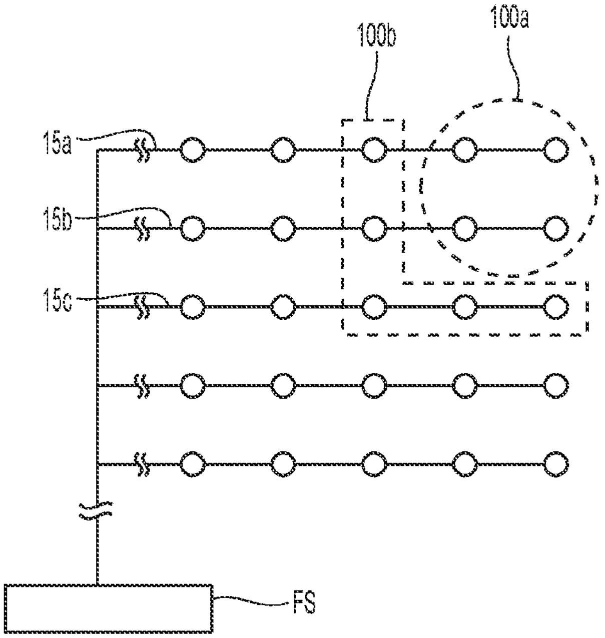
FIG. 4A-4B are illustrative schematic views of design sprinkler sets in the design areas of FIGS. 3A and 3B having a hybrid minimum design pressure.
Figure 4B:
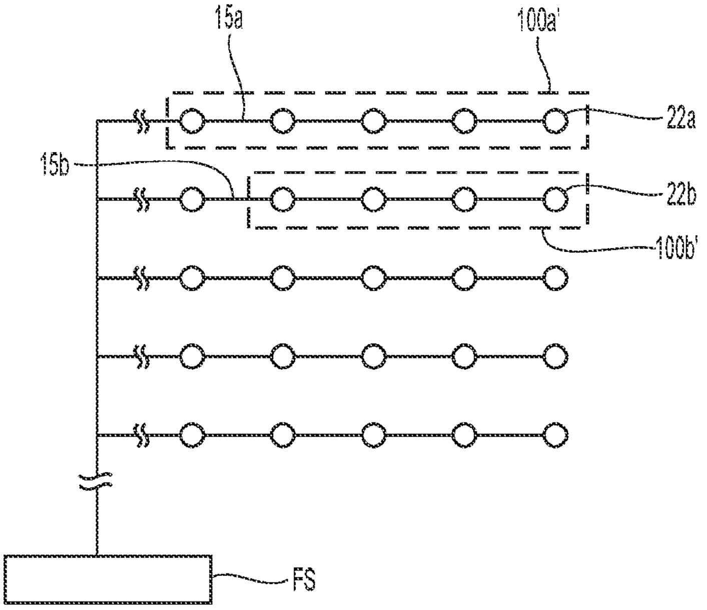

Notwithstanding the preferred embodiments shown in each FIG. 4A and FIG. 4B, it should be understood that design areas having a different total number of design sprinklers, for example, a total of eight, ten or twelve sprinklers disposed on two, three or four branch lines, can be configured with the preferred hybrid minimum design pressure of differing hydraulic minimum design pressures prescribed for a corresponding number of sets of design sprinklers, provided the design area hydraulically provides for the desired ceiling-only storage protection. Thus, a first set of design sprinklers of one to five sprinklers on one or more branch lines can have a first hydraulic minimum design pressure preferably of less than one hundred pounds per square inch (100 psi.) and a second set of the remaining total of design sprinklers disposed over one or more branch lines, can have a second hydraulic minimum design pressure preferably of less than one hundred pounds per square inch (100 psi.) and different than the first hydraulic minimum design pressure.

For the design sprinklers and design areas of the previously described ceiling-only systems, the prescribed minimum hydraulic design pressures and the more preferred hybrid minimum design pressures provide for a minimum volume of fluid flow therefrom to define a preferred hydraulic demand of the ceiling-only. For the preferred five to twelve (5-12) design sprinklers defining the hydraulic design area of the system, the minimum flow or demand defined by the preferred design pressures is preferably less than 3000 gallons per minute (GPM), more preferably less than 2500 GPM, even more preferably approximately 2000 GPM and yet even more preferably less than 2000 GPM. In preferred embodiments of the system having a hydraulic design area defined by nine (9) design sprinklers prescribed a preferred hybrid minimum design pressure, the total minimum flow is preferably 1750 GPM, more preferably no more than 1700 GPM and even more preferably no more than 1600.

Preferred embodiments of the system having a hybrid minimum design pressure define a first preferred hydraulic demand of the system based exclusively on the first set of design sprinklers of the design area prescribed with a first hydraulic minimum design pressure and a second hydraulic demand of the system based on the second set of design sprinklers prescribed with a different second hydraulic minimum design pressure and inclusive of the first set of design sprinklers at the different second hydraulic minimum design pressure. In a preferred embodiment of the system defined by a design area with a hybrid minimum design pressure, the first set of design sprinklers define a first total minimum flow of approximately 1000 GPM for the system, and the second set of design sprinklers inclusive of the first set define a second total minimum flow of approximately 1600 GPM for the system.

Figure 5:
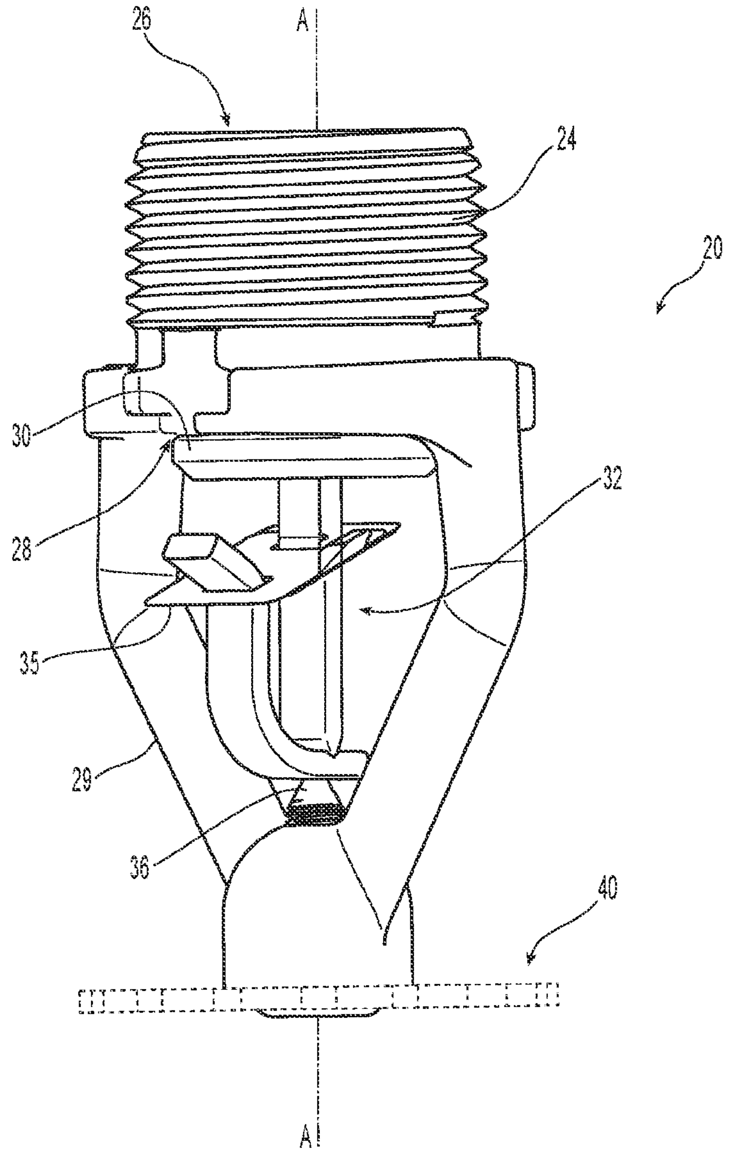
FIG. 5 is perspective illustrative view of a preferred sprinkler for use in the system of FIG. 1.
Figure 5A:
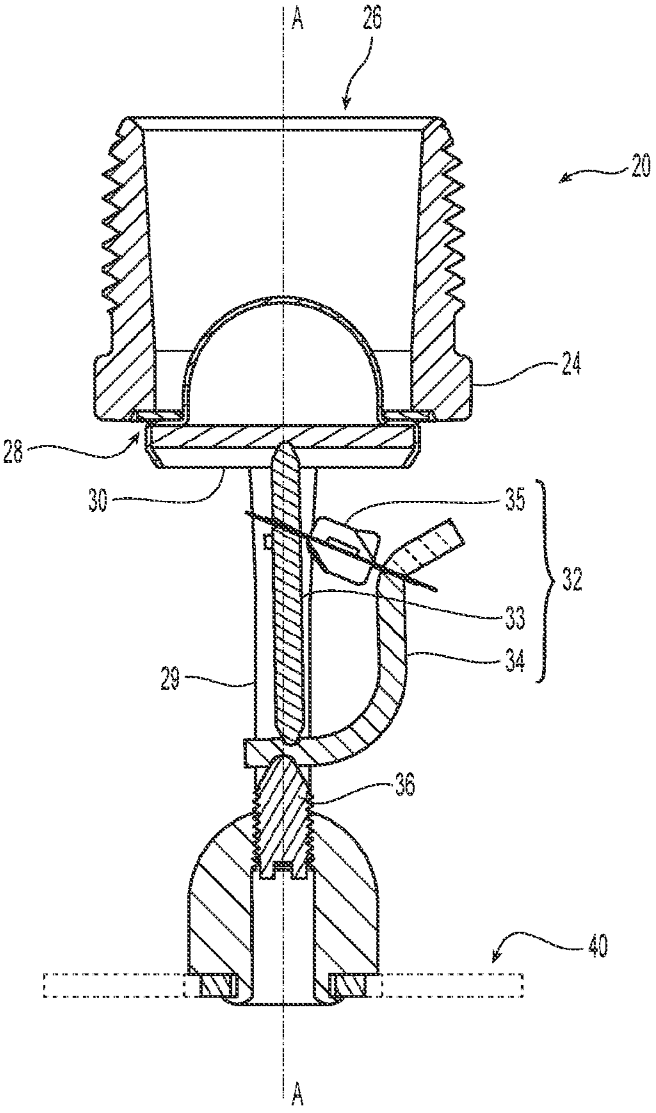
FIG. 5A is a cross-sectional view of the sprinkler of FIG. 5.

The preferred system 10 can be configured for the protection of high hazard commodities in rack storage beneath a ceiling that of up to fifty-five feet (55 ft.) in height and lower using sprinklers that have been shown to preferably produce suppression performance in addressing a high hazard commodity fire from a vertical distance of fifty-five feet. Preferably, the sprinklers can provide suppression performance with a preferred minimum operating pressure of less than 100 psi. An illustrative embodiment of a suppression fire protection sprinkler 20 for use in the system 10 is shown in FIGS. 5 and 5A. The sprinkler 20 is preferably embodied as an automatic sprinkler having a body 24 with an internal passageway having a fluid inlet 26 and an outlet 28 spaced apart from one another and axially aligned along a sprinkler axis A-A to define the sprinkler orifice and its discharge characteristics. Generally, the discharge characteristics of the sprinkler body define a preferred nominal K-factor in a range of 11 [GPM/(psi)$^{1/2}$] to 50 [GPM/(psi)$^{1/2}$] and more preferably ranging from 14.0 [GPM/(psi)$^{1/2}$] to 36.4 [GPM/(psi)$^{1/2}$] and even more particularly any one of 14.0; 16.8, 19.6; 22.4; 25.2; 28.0; 30.8, 33.6 or 36.4 [GPM/(psi)$^{1/2}$]. Preferred embodiments of the sprinkler and sprinkler body for use in the system 10 define a nominal K-factor which range from 22.4 [GPM/(psi)$^{1/2}$] to 36.4 [GPM/(psi)$^{1/2}$] and are yet even more preferably any one of 22.4, 25.2; 28.0; 30.8, 33.6 or 36.4 [GPM/(psi)$^{1/2}$].

With reference to FIG. 4A to illustrate a system with a hybrid minimum design pressure having a first and second total minimum flows each of less than 1700 GPM, the sprinklers of the system have a preferred nominal K-factor of 28.0 [GPM/(psi)$^{1/2}$] with a design area defined by a total of nine sprinklers with a prescribed hybrid minimum design pressure that includes a first hydraulic minimum design pressure of 80 psi. and a second hydraulic minimum design pressure of 40 psi. Hydraulically, upon exclusive activation of the preferred first set 100*a* of four design sprinklers at the 80 psi minimum design pressure, a minimum flow or demand of approximately 1000 GPM is determined. The second set 100*b* of five design sprinklers, preferably inclusive of the first set 100*a*, at the 40 psi minimum design pressure hydraulically determines a minimum flow or demand of approximately 1600 GPM upon actuation of all nine design sprinklers. Accordingly, the preferred prescribed hybrid minimum design pressures provide for a minimum volume of fluid flow that is less than 1700 GPM and more preferably no more than 1600.

A closure assembly 30 and a thermally responsive or heat sensitive trigger 32 maintains the outlet 28 sealed in an unactuated state of the sprinkler. The trigger 32 can be configured as a frangible glass bulb or a fusible link arrangement. The actuation, operation or thermal responsiveness of the sprinkler to fire or sufficient level of heat is preferably faster than standard response, e.g., quick response, fast response or early fast response, with a preferred response time index (RTI) of 50 (m*s)$^{1/2}$ [100 (ft.*s)$^{1/2}$] or less, preferably no more than 36 (m*s)$^{1/2}$, [65 (ft.*s)$^{1/2}$], and even more preferably 19 to 36 (m*s)$^{1/2}$ [35-65 (ft.*s)$^{1/2}$]. Accordingly, the sprinkler 20 is preferably a quick response storage sprinkler as understood from the FM standards. The thermally responsive triggers of the sprinklers are preferably thermally rated in a range of 155° F. to 210° F. and more preferably ranges from 164° F. to 205° F. and are preferably thermally rated at 165° F.

The preferred thermally or heat responsive trigger assembly 32 is preferably disposed between the body 24 and the deflector 40 to maintain the closure assembly 30 in the outlet 28 sealed in an unactuated state of the sprinkler. As shown in FIG. 5A, the closure assembly 30 preferably includes a plug disposed in the outlet 28. The thermally responsive trigger assembly 32 preferably includes a strut 33, a lever 34 with a preferred fusible temperature-reactive link 35 coupling the strut 33 and lever 34 together in an actuatable position between the body 24 and the deflector 40 to support the closure assembly 30 within the outlet 28. The thermally responsive trigger assembly 32 transfers a compressive force of a load member 36, such as for example a threaded screw member, acting on the strut lever arrangement to the closure assembly 30. The preferred thermally responsive link 35 is preferably constructed to provide a consistent operability not available in prior fusible links. As used herein, "consistent operability" means that the fusible link is constructed to have an RTI that is within a preferred standard deviation of a preferred value such as, for example, a mean value in a preferred RTI range. The preferred RTI range can be, for example, a full range characterizing the trigger, e.g., Quick Response RTI of 19 to 36 (m-s)$^{1/2}$ or any subrange thereof. More particularly, preferred fusible links are constructed to provide for an actual RTI value that falls within a standard deviation of 6-7 of a preferred RTI mean, more preferably with a standard deviation of less than 6 of the preferred RTI mean and more preferably within a standard deviation of 2-3 of the preferred RTI mean. By providing sprinklers with the preferred fusible links of consistent operability, a plurality of sprinklers can be provided with low variance in the thermal sensitivity and/or operational characteristics between sprinklers.

Generally, the preferred fusible link 35 includes a first plate member and a second plate member joined to one another by a solder joint. Each plate member is preferably formed from beryllium nickel, such as for example, UNS-N03360 beryllium nickel. Alternatively, the plates may be formed from aluminum, steel, or copper, for example, or any other metallic material. A preferred applied solder is a eutectic solder to define a preferred temperature rating of 165° F. (74° C.) or 205° F. (96° C.) or alternatively a non-eutectic solder is applied for defining a preferred temperature rating of 161° F. (72° C.). In order to ensure a preferred adherence of the finishing coat to the soldered plates, the surfaces of the soldered elements are prepared with a surface treatment or preparation sufficient to sufficiently adhere a protective or finishing coating. Preferred embodiments of the link assembly 35 include one or more finishing coatings of an enamel paint.

Referring again to FIGS. 5 and 5A, a preferred embodiment of the suppression sprinkler 20 includes a nominal K-factor of 28.0 [GPM/(psi)$^{1/2}$], a thermal sensitivity defined by an RTI of 50 (m*s)$^{1/2}$ [100 (ft.*s)$^{1/2}$] or less and a deflector 40. The sprinkler 20 is preferably configured for installation in a pendent type orientation with the fluid distribution deflector 40 coupled to the body 24 of the sprinkler 20 and spaced from the outlet 28 at fixed distance by a pair of frame arms 29. The distribution of fluid discharged from the sprinkler body defines a preferred spray pattern and coverage of the sprinkler which defines the preferred sprinkler spacing of the sprinkler. As previously noted, the sprinklers of the system 10 preferably define a preferred sprinkler-to-sprinkler S1, S2 spacing of eight to twelve feet (8-12 ft.) and more preferably a sprinkler-to-sprinkler spacing of eight to ten feet (8-10 ft.).

Figure 6:
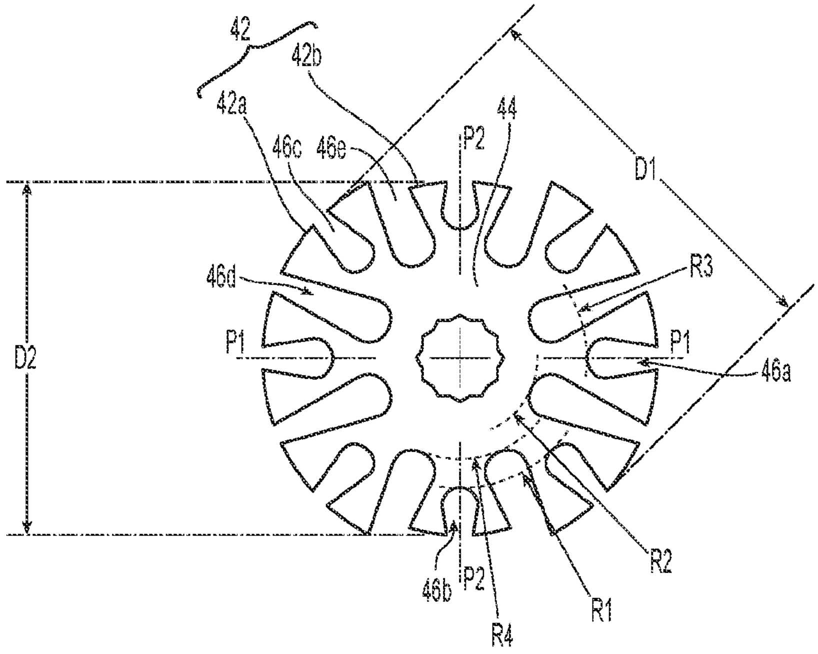
FIG. 6 is a preferred fluid deflector for use in the sprinkler of FIG. 5.

The geometry of a fluid distribution deflector 40 is generally defined by its perimeter, its center and tines and slots extending between the center and perimeter. Although deflectors 40 of the system 10 can have a circular geometry defining a constant width or diameter about its center, preferred embodiments of the deflector have a variable width or diameter. A preferred sprinkler fluid distribution deflector 40 is shown in FIG. 6 centered along the sprinkler axis A-A. The preferred deflector 40 has a perimeter 42 and a central portion 44 with the deflector including a plurality of spaced apart tines defining a plurality of opposed slot pairs 46*a*, 46*b*, 46*c*, 46*d*, and 46*e* slot between adjacent tines. Each slot has a first width at the perimeter 42 of the deflector and radiused portion between the first width and the central portion 44 of the deflector. The spaced apart terminal ends of each tine define the perimeter 42. The perimeter 42 preferably includes a first perimeter 42*a* on a first circle concentric to the sprinkler axis defining a first diameter D1. The perimeter 42 includes a second perimeter portion 42*b* on a second circle concentric to the sprinkler axis defining a second diameter D2 less than the first diameter D1. Accordingly, there are at least a first plurality of tines located on or terminating at the first circle and at least a second plurality of tines located on or terminating at the second circle. Notably, for at least one pair of opposed slots 46*e*, the tine on one side of the slot terminates at the first circle and the tine on the other side of the slot terminates on the second circle. In a preferred embodiment, the diameters define a preferred first-to-second diameter ratio that ranges from 1.1:1 to 1.2:1. In an alternate embodiment, the tines can terminate on or define different perimeter geometries for example different first and second rectangles to provide a perimeter of varying the widths.

The five different opposed slot pairs 46*a*, 46*b*, 46*c*, 46*d*, and 46*e* are differentiated by their location and geometry including their radial lengths and widths. The first group of opposed slot pairs 46*a* includes a first opposed pair that terminate at the first circle and aligned along a first bisecting plane P1. The second group of opposed slot pairs 46*b* includes a first opposed pair that terminate at the second circle and aligned along a second bisecting plane P2. In the sprinkler assembly, the second group of opposed slot pairs 46*b* and the second bisecting plane P2 are preferably aligned with the frame arms 25. The third group of slots 46*c* is preferably disposed between the first and second group of opposed pair of slots 46*a*, 46*b* and preferably equiangularly disposed between the first and second group of opposed pair of slots 46*a*, 46*b*. Accordingly, the third group of slots 46*c* preferably include two pairs of opposed slots disposed at a forty-five degree angle (45°) between the first and second bisecting planes. In another preferred aspect, a fourth group of opposed slot pairs 46*d* is preferably disposed between the first and third group of slots 46*a*, 46*c*. A fifth group of opposed slot pairs 46*e* is preferably disposed between the second and third group of slots 46*b*, 46*c*.

As shown the shortest slots are the second opposed pair 46*b* with the longest opposed pair being the fourth opposed pair 46*d*. In defining the slot lengths of the various slot groups, the radiused portions of each slot is tangent to a concentric circle circumscribed about the center. Each of the second and third group of slots 46*b*, 46*c* are tangent to circle having a first radius R1 about the deflector center that is the largest for all slot groups and the fifth group of slots 46*e* is tangent to a circle having a second radius R2 about the deflector center that is the smallest for all slot groups. The radius portions of the first and fourth slots are preferably tangent to different circles having respective radii R3, R4 between the largest and smallest concentric circles. The terminal widths of three slot groups 46*a*, 46*c* and 46*d* are the same at the perimeter of the deflector. Each of the second and fifth slot groups 46*b*, 46*e* are different from one another and the other three slot groups.

Further variations in the slot features or variations in the combination of like slot features can define alternate embodiments of the deflector that are suitable for providing a suppression-like spray pattern for use in the system 10. For example, all the slot groups can have a common slot width at the perimeter with the second group of slots 46*b* being the longest slots and the fifth group of slots being the shortest. To vary the lengths of the slots, the concentric circles can define alternative radii from the deflector center to which one or more radiused slot portions run tangent.

As described above, the total fluid flow from a sprinkler is a function of the discharge coefficient and fluid pressure provided to the sprinkler. The fluid flow from the sprinkler in combination with the spray pattern defined by the deflector 40 can define the performance for the preferred ceiling-level sprinkler over a range of heights and commodities. The preferred range of fluid pressures for operation of the preferred sprinklers of the system 10 produce suppression performance in addressing a fire size indicative of a high hazard commodity fire from a vertical distance of fifty-five feet. Thus, the operational combination of preferred sprinklers and hybrid minimum design pressure in the system 10 provide for the protection of high hazard commodities in rack storage beneath a ceiling that of up to fifty-five feet (55 ft.) in height and lower.

Having identified a preferred sprinkler for use in the system 10, methods of fire protection of high hazard commodities beneath a peak ceiling height of up to fifty-five feet (55 ft.) are provided using a preferred hybrid minimum design pressure. Obtaining a preferred sprinkler can include any one of manufacturing or acquiring the preferred sprinklers; and providing can include any one of selling, specifying, or supplying the preferred sprinkler. For example, one preferred method of supplying a ceiling-only storage occupancy fire protection system includes obtaining a plurality of pendent sprinklers. Each sprinkler preferably including: a sprinkler body defining a nominal K-factor of any one of 28.0 and 36.4, a closure assembly and a thermally rated trigger assembly having a response time index (RTI) of 50 $(m*s)^{1/2}$ [100 $(ft.*s)^{1/2}$] or less, preferably no more than 36 $(m*s)^{1/2}$, [65 $(ft.*s)^{1/2}$], and even more preferably 19 to 36 $(m*s)^{1/2}$ [35-65 $(ft.*s)^{1/2}$]. The preferred method also preferably includes providing the plurality of sprinklers for installation in a grid of sprinklers in which hydraulically remote sprinklers in the grid of sprinklers define a hydraulic design area of the system of five to no more than twelve (5-12) design sprinklers and preferably no more than twelve (5-12) design sprinklers to provide storage fire protection of at least one commodity of one of Class 1, Class 2, Class 3, Class 4 and/or cartooned unexpanded plastic and combinations thereof. In the preferred method, the sprinklers are preferably installed beneath a ceiling having a maximum ceiling height of fifty-five feet (55 ft.) with the stored commodity having a maximum storage height of up to fifty feet (50 ft.) in a rack storage arrangement being any one of single-row, double-row, and multi-row rack storage to define a clearance distance between the commodity and the ceiling of at least five feet (5 ft.).

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A ceiling-only storage occupancy fire protection system comprising:

a grid of pendent fire protection sprinklers defining a sprinkler-to-sprinkler spacing ranging from eight feet to twelve feet (8 ft.-12 ft.), each sprinkler including:

a sprinkler body having an inlet and an outlet with a passageway disposed therebetween along a sprinkler axis and a nominal K-factor of 14.0 [GPM/$(psi)^{1/2}$] to 36.4 [GPM/$(psi)^{1/2}$];

a closure assembly including a plug;

a thermally responsive trigger assembly to support the closure assembly adjacent the outlet of the sprinkler body and seal the outlet in an unactuated state of the sprinkler, the trigger assembly having a temperature rating in a range from 155° F. to 210° F.; and a deflector coupled to the body and spaced from the outlet; and a network of pipes including at least one main pipe and a plurality of spaced apart branch lines interconnecting and locating the grid of pendent sprinklers beneath a ceiling having a ceiling height of up to a maximum of fifty-five feet (55 ft.), the network of pipes locating the grid of sprinklers relative to a source of firefighting fluid to define a hydraulic design area of the system with a total number of design sprinklers ranging from five to no more than twelve (5-12) design sprinklers, the network of pipes being filled with the firefighting fluid to provide the design sprinklers with a prescribed hydraulic minimum design pressure in an unactuated state of the system for storage protection of a high-piled storage arrangement including at least one commodity including of any one of Class 1, Class 2, Class 3, Class 4 and/or cartooned unexpanded plastic commodities and combinations thereof, stored beneath the ceiling and below the grid of sprinklers, the at least one commodity having a maximum storage height of up to fifty feet (50 ft.), the storage arrangement having a configuration of rack storage, the rack storage being any one of single-row, double-row, and/or multi-row rack storage, wherein the prescribed hydraulic minimum design pressure includes a hybrid minimum design pressure.

2. The system of claim 1, wherein the hybrid minimum design pressure includes a first hydraulic minimum design pressure and a second hydraulic minimum design pressure being different than the first hydraulic minimum design pressure; and wherein the total number of design sprinklers define a first set of design sprinklers prescribed with the first hydraulic minimum design pressure and a second set of design sprinklers prescribed with the second hydraulic minimum design pressure.

3. The system of claim 2, wherein the first hydraulic minimum design pressure and the second hydraulic minimum design pressure define a differential therebetween that ranges from 10%-50%.

4. The system of claim 2, wherein the first set of design sprinklers has no more than five design sprinklers and the first hydraulic minimum design pressure is eighty pounds per square inch (80 psi.); and wherein the second set of design sprinklers has no more than five additional design sprinklers than the first set of design sprinklers and the second hydraulic minimum design pressure is forty pounds per square inch (40 psi.).

5. The system of claim 3, wherein the total number of design sprinklers defining the hydraulic design area is nine (9).

6. The system of claim 5, wherein the design sprinklers comprise three sprinklers on a first branch line, three sprinklers on a second branch line, and three sprinklers on a third branch line, the first, second, and third branch lines being separate branch lines of the plurality of spaced apart branch lines, wherein the nominal K factor is 22.4, 25.2, 28.0, or 30.8, and wherein the storage height is forty-five to fifty feet (45-50 ft.).

7. The system of claim 3, wherein the design sprinklers defining the hydraulic design area comprise three sprinklers disposed on a first branch line, three sprinklers disposed on a second branch line, and three sprinklers disposed on a third branch line, the first, second, and third branch lines being separate branch lines of the plurality of spaced apart branch lines, wherein the first set of design sprinklers is four design sprinklers and the first hydraulic minimum design pressure is eighty pounds per square inch (80 psi.), wherein the second set of design sprinklers includes the four design sprinklers of the first set of design sprinklers and five additional design sprinklers and the second hydraulic minimum design pressure is forty pounds per square inch (40 psi.), wherein the K-factor is 28.0 or 30.8, wherein the storage height is forty-five feet (45 ft.), and wherein a clearance between the at least one commodity and ceiling comprises at least five feet (five ft.).

8. The system of claim 7, wherein the deflector of each sprinkler in the grid of pendent sprinklers is located up to fourteen inches (14 in.) below the ceiling.

9. The system of claim 7, wherein the rack storage has an aisle width of no more than eight feet (8 ft.).

10. The system of claim 7, wherein the thermally responsive trigger assembly of each sprinkler includes a strut lever arrangement with a fusible link, and a response time index of 100 $(ft.*s)^{1/2}$ or less.

11. A method of supplying a ceiling-only storage occupancy fire protection system, the method comprising:

obtaining a plurality of storage sprinklers, and providing the plurality of storage sprinklers for ceiling-only installation above a high-piled storage arrangement of commodities and relative to a source of fire-fighting fluid to provide a hydraulic design area defined by a total number of five to no more than twelve design sprinklers with a prescribed hydraulic minimum design pressure in an unactuated state of the system, the prescribed hydraulic minimum design pressure including a hybrid minimum design pressure;

wherein the providing the plurality of storage sprinklers includes prescribing the hybrid minimum design pressure including a first hydraulic minimum design pressure and a second hydraulic minimum design pressure that is different than the first hydraulic minimum design pressure; and prescribing the total number of design sprinklers defining a first set of design sprinklers prescribed with the first hydraulic minimum design pressure and a second set of design sprinklers prescribed with the second hydraulic minimum design pressure.

12. The method of claim 11, wherein the first hydraulic minimum design pressure and the second hydraulic minimum design pressure defines a differential therebetween that ranges from 10%-50%.

13. The method of claim 11, wherein the total number of design sprinklers defining the hydraulic design area is nine (9), wherein the design sprinklers comprise three sprinklers on a first branch line, three sprinklers on a second branch line, and three sprinklers on a third branch line, the first, second, and third branch lines being separate branch lines of a plurality of spaced apart branch lines, wherein the first set of design sprinklers has no more than five design sprinklers and the first hydraulic minimum design pressure is eighty pounds per square inch (80 psi.), and wherein the second set of design sprinklers has no more than five additional design sprinklers than the first set of design sprinklers and the second hydraulic minimum design pressure is forty pounds per square inch (40 psi.).

14. The method of claim 13, wherein obtaining the plurality of sprinklers includes obtaining sprinklers with a sprinkler body that has a nominal K-factor of any one of 22.4; 25.2; 28.0; 30.8; 33.6 or 36.4 [GPM/(psi)$^{1/2}$], and a thermally responsive trigger assembly having a response time index of 100 (ft.*s)$^{1/2}$ or less.

15. A method of providing ceiling-only storage occupancy fire protection, the method comprising:

installing a grid of pendent sprinklers in a network of pipes, the sprinklers defining a sprinkler-to-sprinkler spacing ranging from eight feet to twelve feet (8 ft.-12 ft.) within two feet of a ceiling having a ceiling height of up to a maximum of fifty-five feet (55 ft.), each sprinkler including: a sprinkler body having an orifice with an inlet and an outlet with a passageway disposed therebetween along a sprinkler axis, the orifice defining a nominal K-factor of in a range of 14.0 [GPM/(psi)$^{1/2}$] to 36.4 [GPM/(psi)$^{1/2}$], a closure assembly including a plug; a thermally rated trigger assembly to support the closure assembly adjacent the outlet of the sprinkler body and seal the outlet in an unactuated state of the sprinkler, the trigger assembly having a temperature rating in a range from 155° F. to 210° F.; and, a deflector coupled to the body and spaced from the outlet; and connecting the network of pipes to a source of firefighting fluid in which a total number of most hydraulically remote sprinklers in the grid of sprinklers define a hydraulic design area with a group of design sprinklers ranging from five to no more than twelve (5-12) design sprinklers, the design sprinklers having a prescribed hydraulic minimum design pressure in an unactuated state of at least one sprinkler in the grid of sprinklers, the network of pipes configured to supply firefighting fluid for suppression protection of a high-piled storage arrangement including at least one commodity including of any one of Class 1, Class 2, Class 3, Class 4 and/or cartooned unexpanded plastic commodities and combinations thereof, the commodity having a maximum storage height of up to fifty feet (50 ft.) beneath the ceiling and below the grid of sprinklers, the storage arrangement having a configuration of at least rack storage, the rack storage being any one of single-row, double-row, and/or multi-row rack storage, wherein the prescribed hydraulic minimum design pressure includes a hybrid minimum design pressure.

16. The method of claim 15, wherein the connecting defines a hydraulic demand that includes a first total minimum flow defined by a first set of design sprinklers and a second total minimum flow defined by a second set of design sprinklers inclusive of the first set of design sprinklers.

17. The method of claim 15, wherein the installing is beneath the ceiling includes one of: the ceiling height being fifty-five feet (55 ft.) for protection of the rack storage having a storage height of fifty feet (50 ft.); or the ceiling height being fifty feet (50 ft.) for protection of the rack storage having a storage height of forty-five feet (45 ft.).

18. The method of claim 15, wherein the connecting the network of pipes to the source of firefighting fluid includes prescribing the hybrid minimum design pressure including a first hydraulic minimum design pressure and a second hydraulic minimum design pressure that is different than the first hydraulic minimum design pressure with the total number of design sprinklers defining a first set of design sprinklers prescribed with the first hydraulic minimum design pressure and a second set of design sprinklers prescribed with the second hydraulic minimum design pressure.

19. The method of claim 18, wherein the first hydraulic minimum design pressure and the second hydraulic minimum design pressure define a differential therebetween that ranges from 10%-50%.

* * * * *